US009558415B2

(12) United States Patent
Paul et al.

(10) Patent No.: US 9,558,415 B2
(45) Date of Patent: *Jan. 31, 2017

(54) BIOMETRIC AUTHENTICATION TECHNOLOGY

(71) Applicant: Accenture Global Services Limited, Dublin (IE)

(72) Inventors: Sanjoy Paul, Karnataka (IN); Abhinav Tiwari, Uttar Pradesh (IN)

(73) Assignee: Accenture Global Services Limited, Dublin (IE)

( * ) Notice: Subject to any disclaimer, the term of this patent is extended or adjusted under 35 U.S.C. 154(b) by 12 days.

This patent is subject to a terminal disclaimer.

(21) Appl. No.: 14/621,819

(22) Filed: Feb. 13, 2015

(65) Prior Publication Data
US 2015/0161460 A1    Jun. 11, 2015

Related U.S. Application Data

(63) Continuation of application No. 13/409,584, filed on Mar. 1, 2012, now Pat. No. 9,020,207.

(30) Foreign Application Priority Data

Jun. 7, 2011 (IN) ............................ 1939/CHE/2011

(51) Int. Cl.
G06K 9/00 (2006.01)
G06F 21/32 (2013.01)

(52) U.S. Cl.
CPC ........... G06K 9/00885 (2013.01); G06F 21/32 (2013.01); G06K 9/00892 (2013.01); G06K 9/00926 (2013.01)

(58) Field of Classification Search
USPC ........................................................ 382/115
See application file for complete search history.

(56) References Cited

U.S. PATENT DOCUMENTS 5,386,103 A    1/1995  DeBan et al.
6,111,517 A    8/2000  Atick et al.
(Continued)

FOREIGN PATENT DOCUMENTS

EP    786735 A2    7/1997
EP    1600882      11/2005

OTHER PUBLICATIONS

EP Search Report in Application No. 13000443.5 dated Jul. 31, 2014, 6 pages.
(Continued)

*Primary Examiner* — Ishrat I Sherali
(74) *Attorney, Agent, or Firm* — Fish & Richardson P.C.

(57) ABSTRACT

Biometric authentication technology, in which biometric data is maintained for a group of people. The biometric data includes sorted similarity scores, where each of the sorted similarity scores is computed to represent similarity between a corresponding biometric image and a reference image. A biometric verification system accesses a biometric image of at least a portion of a person, accesses the reference image, and computes a similarity score that represents similarity between the accessed biometric image and the reference image. The biometric verification system searches the sorted similarity scores included in the biometric data using the computed similarity score and outputs a result based on the searching.

19 Claims, 10 Drawing Sheets

(56) References Cited

U.S. PATENT DOCUMENTS

| | | | |
|---|---|---|---|
| 6,496,595 | B1 | 12/2002 | Puchek et al. |
| 8,948,465 | B2 * | 2/2015 | Tiwari ............... G06K 9/00771 |
| | | | 382/115 |
| 9,020,207 | B2 * | 4/2015 | Paul ........................ G06F 21/32 |
| | | | 382/115 |
| 9,262,675 | B2 * | 2/2016 | Wabgaonkar ........... G06T 7/408 |
| 9,292,749 | B2 | 3/2016 | Tiwari et al. |
| 9,390,338 | B2 | 7/2016 | Tiwari et al. |
| 2003/0184468 | A1 | 10/2003 | Chen et al. |
| 2004/0240711 | A1 | 12/2004 | Hamza et al. |
| 2005/0063566 | A1 | 3/2005 | Beek et al. |
| 2005/0265603 | A1 | 12/2005 | Porter et al. |
| 2006/0104484 | A1 | 5/2006 | Bolle |
| 2006/0104487 | A1 | 5/2006 | Porter et al. |
| 2007/0047775 | A1 | 3/2007 | Okubo |
| 2007/0269082 | A1 | 11/2007 | Matsuyama |
| 2010/0157040 | A1 | 6/2010 | Ofir |
| 2010/0157128 | A1 | 6/2010 | Choi et al. |
| 2010/0329568 | A1 | 12/2010 | Gamliel et al. |
| 2011/0074950 | A1 | 3/2011 | Oka et al. |
| 2011/0106734 | A1 | 5/2011 | Boult et al. |
| 2011/0228094 | A1 | 9/2011 | Cheng |
| 2012/0314911 | A1 | 12/2012 | Paul |
| 2013/0195316 | A1 | 8/2013 | Bataller et al. |
| 2013/0266193 | A1 | 10/2013 | Tiwari |
| 2015/0178569 | A1 | 6/2015 | Tiwari et al. |

OTHER PUBLICATIONS

U.S. Non-Final Office Action for U.S. Appl. No. 14/585,480 dated Jun. 5, 2015, 21 pages.

U.S. Notice of Allowance for U.S. Appl. No. 14/585,480 dated Jul. 31, 2015, 8 pages.

Hsieh et al., "Image Enhancement and Image Hiding Based on Linear Image Fusion—Image Fusion," Osamu Ukimura (Ed.), ISBN: 978-953-307-679-9, InTech, Available from: http://www.intechopen.com/books/image-fusion/image-enhancement-and-image-hiding-based-on-linearimage-fusion, Jan. 12, 2011, pp. 23-42.

European Search Report for Application No. 13162720.0-1901 dated Aug. 13, 2013, 3 pages.

Pinto, Examiner in corresponding European Application No. EP12004276.7, "European Search Report", Dec. 4, 2012, 5 pages.

European Office Action in Application No. 13162720.2-1901 dated Apr. 23, 2014, 9 pages.

Brian C. Lovell et al.: "Invited Paper: Embedded Face and Biometric Technologies for National and Border Security", Computer Vision and Pattern Recognition Workshops (CVPRW), 2011 IEEE Computer Society Conference on, IEEE, Jun. 20, 2011, pp. 117-122, XP031926583.

Brian C. Lovell et al.: "Parallel Distributed Face Search System for National and Border Security", The 7th U.S./Australia Joint Workshop on Defense Applications of Signal Processing (DASP), Jul. 10, 2011, pp. 117-123, XP055074042.

Knuth, "The Art of Computer Programming", vol. 3, Section 6.2.1 :Searching an Ordered Table, Second Edition, Third Printing. Addison-Wesley, Aug. 1998 ISBN 0-201-89685-0, 20 pages.

Monro, et al., "DCT-based Iris Recognition" published in IEEE Transactions on Pattern Analysis and Machine Intelligence, vol. 29, No. 4, Apr. 2007, 10 pages.

Qi Han et al: "A Non-uniform Quantizing Approach to Protect Biometric Templates", Intelligent Information Hiding and Multimedia Signal Processing, 2006. IIH-MSP '06. International Conference on, IEEE, PI, Dec. 1, 2006, pp. 693-698, XP031034150.

Stan Z. Li et al: "Biometrics at a Distance: Issues, Challenges, and Prospects", Jan. 1, 2009, Handbook of Remote Biometrics : Advances in Pattern Recognition; [Advances in Pattern Recognition], Springer, UK, pp. 3-21, XP008163781.

Tsalakanidou et al: "A 3D face and hand biometric system for robust user-friendly authentication", Pattern Recognition Letters, Elsevier, Amsterdam, NL, vol. 28, No. 16, Oct. 11, 2007, pp. 2238-2249, XP022293676.

Turk, et al. "Eigenfaces for Recognition", Journal of Cognitive Neuroscience, vol. 3, No. 1, Jan. 1, 1991, pp. 71-86.

U.S. Non-Final Office Action for U.S. Appl. No. 13/409,584 dated Aug. 29, 2014, 21 pages.

U.S. Notice of Allowance for U.S. Appl. No. 13/598,819 dated Sep. 26, 2014, 24 pages.

U.S. Notice of Allowance for U.S. Appl. No. 13/409,584 dated Nov. 12, 2014, 12 pages.

U.S. Notice of Allowance for U.S. Appl. No. 15/019,500 dated Apr. 15, 2016, 12 pages.

European Office Action for Application No. 13162720.0, dated Jul. 12, 2016, 6 pages.

U.S. Notice of Allowance for U.S. Appl. No. 15/177,714, dated Aug. 31, 2016, 10 pages.

U.S. Notice of Allowance for U.S. Appl. No. 14/882,552 dated Nov. 30, 2015, 25 pages.

* cited by examiner

BIOMETRIC AUTHENTICATION TECHNOLOGY

CROSS-REFERENCE TO RELATED APPLICATION(S)

This application is a continuation (and claims the benefit of priority under 35 USC 120) of U.S. application Ser. No. 13/409,584, filed Mar. 1, 2012, now allowed, which claims the benefit of Indian Patent Application No. 1939/CHE/2011, filed on Jun. 7, 2011. Both of these prior applications are incorporated herein by reference in their entirety for all purposes.

FIELD

This disclosure relates to biometric authentication technology.

BACKGROUND

A typical biometric authentication system includes a database of biometric information (e.g., fingerprints, iris scans, facial images, etc.) about individuals. To identify or authenticate a sample of biometric information, the typical biometric authentication system compares the sample with entries in the database one by one until a match is found. As a result, the time to find a matching entry grows linearly and may be time consuming when the database includes many entries.

SUMMARY

In one aspect, a biometric authentication system includes a data storage system configured to maintain, for a group of people, biometric data that includes sorted similarity scores. Each of the sorted similarity scores is computed to represent similarity between a corresponding biometric image and a reference image. The biometric authentication system also includes a biometric verification system that includes at least one processor. The biometric verification system is configured to access a biometric image of at least a portion of a person, access the reference image, and compute a similarity score that represents similarity between the accessed biometric image and the reference image. The biometric verification system also is configured to search the sorted similarity scores included in the biometric data using the computed similarity score and output a result based on the search of the sorted similarity scores included in the biometric data using the computed similarity score.

Implementations may include one or more of the following features. For example, the biometric verification system may be configured to search the sorted similarity scores in a manner that leverages knowledge of how the similarity scores included in the biometric data are sorted. In this example, the biometric verification system may be configured to perform a binary search of the sorted similarity scores using the computed similarity score.

In addition, the biometric verification system may be configured to access an image of an iris of the person, access a reference image of an iris of a reference person, and compute a similarity score that represents similarity between the accessed image of the iris of the person and the reference image of the iris of the reference person. The biometric verification system may be configured to access an image of a fingerprint of the person, access a reference image of a fingerprint of a reference person, and compute a similarity score that represents similarity between the accessed image of the fingerprint of the person and the reference image of the fingerprint of the reference person. The biometric verification system may be configured to access the biometric image of at least the portion of the person by accessing an image of a face of the person, access a reference image of a face of a reference person, and compute a similarity score that represents similarity between the accessed image of the face of the person and the reference image of the face of the reference person.

In some implementations, the biometric authentication system may include a biometric enrollment system configured to determine, for each person in the group of people, a similarity score that represents similarity between a biometric image of at least a portion of the corresponding person and the reference image and sort the biometric data based on the determined similarity scores. In these implementations, the biometric data maintained by the data storage system may include detailed biometric data for each person in the group of people. The detailed biometric data for each person may include data that is more descriptive of the biometric image of the portion of the corresponding person than the similarity score for the corresponding person and that has a greater storage size than the similarity score for the corresponding person. Further, in these implementations, the biometric enrollment system may be configured to link, for each person in the group of people, the similarity score for the corresponding person with the detailed biometric data for the corresponding person.

Also, the data storage system may include a memory storage system and a disk storage system. The data storage system may be configured to maintain the sorted similarity scores in the memory storage system and maintain the detailed biometric data in the disk storage system.

In some examples, the biometric enrollment system may be configured to enroll a new person in the data storage system. In these examples, the biometric enrollment system may be configured to access a new biometric image of at least a portion of the new person, access the reference image, and compute a new similarity score that represents similarity between the new biometric image and the reference image. Also, in these examples, the biometric enrollment system may be configured to determine a unique identifier for the new person, store, in the data storage system and in association with the unique identifier, the new similarity score at an appropriate point in the sorted similarity scores, and store, in the data storage system and in association with the unique identifier, detailed biometric data for the new person. The detailed biometric data for the new person may be more descriptive of the new biometric image than the new similarity score and may have a greater storage size than the new similarity score.

In some implementations, the biometric verification system may be configured to access multiple biometric images of the portion of the person and compute, for each of the multiple biometric images, a similarity score that represents similarity between the corresponding biometric image and the reference image. In these implementations, the biometric verification system may be configured to compute an average similarity score based on the similarity scores computed for the multiple biometric images.

In some examples, the biometric verification system may be configured to use a search process that leverages knowledge of how the similarity scores included in the biometric data are sorted to find a closest match to the computed similarity score. In these implementations, the biometric verification system may be configured to compute a difference between the computed similarity score and a similarity score of the closest match, compare the difference to a threshold, and, based on comparison results, determining whether the difference is within the threshold. The biometric verification system may be configured to output the closest match based on a determination that the difference is within the threshold. Based on a determination that the difference is not within the threshold, the biometric verification system may be configured to add, in the data storage system, the computed similarity score at an appropriate point in the sorted similarity scores and output an indication that a match was not found.

In some implementations, the biometric verification system may be configured to use a search process that leverages knowledge of how the similarity scores included in the biometric data are sorted to find a subset of the people that are each associated with a similarity score within a threshold of the computed similarity score and access detailed biometric data for the subset of the people. The detailed biometric data for each person in the subset may include data that is more descriptive of the biometric image of the portion of the corresponding person than the similarity score for the corresponding person and that has a greater storage size than the similarity score for the corresponding person. In these implementations, the biometric verification system may be configured to compare the accessed detailed biometric data for the subset of the people to detailed biometric data for the person, identify a match based on comparison results, and output the identified match. The detailed biometric data for the person may be more descriptive of the biometric image than the computed similarity score and may have a greater storage size than the computed similarity score.

In addition, the biometric verification system may be configured to use an image similarity process to generate a similarity measure between the accessed biometric image and the reference image and normalize the similarity measure to a similarity score between zero and one. The biometric verification system also may be configured to access multiple biometric images of the person and access multiple reference images, where each of the multiple biometric images may correspond to a different portion of the person and each of the multiple reference images may correspond to a different portion of a person and may map to one of the multiple biometric images. The biometric verification system further may be configured to compute multiple similarity scores and compute a fused similarity score based on the multiple similarity scores. Each of the multiple similarity scores may represent similarity between one of the multiple biometric images and one of the multiple reference images and the biometric verification system may be configured to search the sorted similarity scores included in the biometric data using the fused similarity score. The biometric verification system may be configured to compute the fused similarity score based on the multiple similarity scores by taking a weighted average of the multiple similarity scores.

In some examples, the biometric verification system may be configured to access multiple biometric images of the person and access multiple reference images, where each of the multiple biometric images may correspond to a different portion of the person and each of the multiple reference images may correspond to a different portion of a person and may map to one of the multiple biometric images. In these examples, the biometric verification system may be configured to compute multiple similarity scores and arrange the multiple similarity scores in a vector of similarity scores. Each of the multiple similarity scores may represent similarity between one of the multiple biometric images and one of the multiple reference images and the biometric verification system may be configured to search the sorted similarity scores included in the biometric data using the vector of similarity scores.

In another aspect, a method includes maintaining, in electronic storage and for a group of people, biometric data that includes sorted similarity scores. Each of the sorted similarity scores is computed to represent similarity between a corresponding biometric image and a reference image. The method also includes accessing a biometric image of at least a portion of a person, accessing the reference image, and computing a similarity score that represents similarity between the accessed biometric image and the reference image. The method further includes searching, by a biometric authentication system that includes at least one processor, the sorted similarity scores included in the biometric data using the computed similarity score and outputting a result based on the searching of the sorted similarity scores included in the biometric data using the computed similarity score.

In yet another aspect, at least one computer-readable storage medium is encoded with executable instructions that, when executed by at least one processor, cause the at least one processor to perform operations. The operations include maintaining, for a group of people, biometric data that includes sorted similarity scores. Each of the sorted similarity scores is computed to represent similarity between a corresponding biometric image and a reference image. The operations also include accessing a biometric image of at least a portion of a person, accessing the reference image, and computing a similarity score that represents similarity between the accessed biometric image and the reference image. The operations further include searching the sorted similarity scores included in the biometric data using the computed similarity score and outputting a result based on the searching of the sorted similarity scores included in the biometric data using the computed similarity score.

The details of one or more implementations are set forth in the accompanying drawings and the description, below. Other potential features of the disclosure will be apparent from the description and drawings, and from the claims.

DETAILED DESCRIPTION

Existing techniques for biometric authentication scale linearly with the number of entries in the biometric database. That is, time to authenticate an individual based on his or her biometrics doubles or triples as the number of entries in the database doubles or triples. The techniques described throughout this disclosure may provide biometric authentication that scales logarithmically. That is, time to authenticate an individual based on his or her biometrics becomes square root of two or square root of three times as the number of entries in the database doubles or triples.

In some implementations, to achieve the improvement in scaling, a biometric authentication system may organize entries of biometric data in a sorted manner and use a search process that leverages knowledge of how the biometric data is sorted to increase the average speed of searching the biometric data. Although biometric image data (e.g., fingerprint images, iris scans, facial images, etc.) is non-numeral, the biometric authentication system sorts the biometric image data by converting biometric images to numeric values in a meaningful way and then sorting the numeric values. To convert the biometric images to numeric values that have meaning, the biometric authentication system uses a reference image and converts biometric images to numeric values based on similarity to the reference image. Because the numeric values represent similarity to the reference image, sorting the numeric values results in sorting biometric images in a meaningful way that may be leveraged in searching the biometric images.

Figure 1:
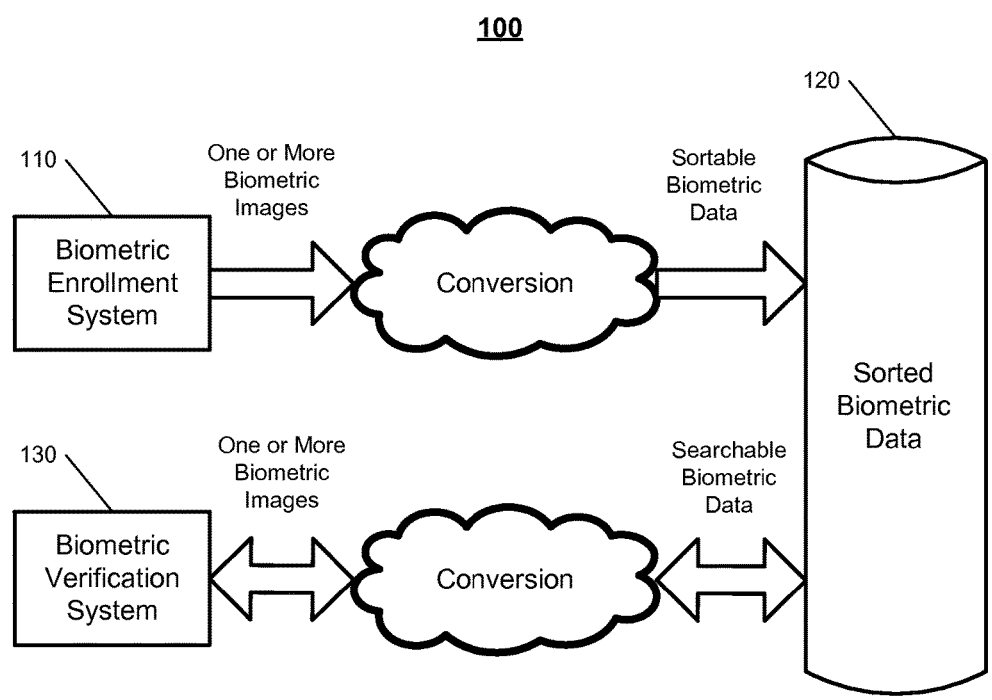
FIGS. 1, 2, and 10 are diagrams of exemplary systems.

FIG. 1 illustrates an exemplary system 100 for performing biometric authentication. The system 100 includes a biometric enrollment system 110, a database 120, and a biometric verification system 130. The biometric enrollment system 110 enrolls people in the system 100 such that biometric data for enrolled persons is searchable in the database 120. Specifically, the biometric enrollment system 110 captures biometric data for a person, converts the biometric data to a format that enables sorting of the biometric data in a meaningful way, and stores, in the database 120, the converted biometric data in association identification information for the person.

The biometric enrollment system 110 may include one or more devices that capture different types of biometric images of at least a portion of a person. For instance, the biometric enrollment system 110 may include a iris scanner that captures an iris image of a person, a camera that captures a facial image of a person, and a fingerprint scanner that captures images of a person's fingerprints. The biometric enrollment system 110 uses the one or more devices to capture one or more biometric images of a person being enrolled in the system 100.

After capturing the one or more biometric images, the biometric enrollment system 110 converts the one or more biometric images into a format that may be sorted in a meaningful manner. In particular, the one or more biometric images may not be sortable in their original format. Accordingly, the biometric enrollment system 110 may distill each of the one or more biometric images into a numeric value that represents content in the corresponding biometric image. The numeric value then may be used to sort the biometric data in the database 120.

To generate the numeric value, the biometric enrollment system 110 may compute a similarity score that represents similarity of the corresponding biometric image to a reference image used for all people enrolled in the system 100. Because each similarity score represents similarity to the same reference image, the similarity scores may reflect how similar biometric images are to one another and allow the biometric data stored in the database 120 to be sorted in a meaningful manner. Other techniques for distilling a biometric image into a numeric value that represents content in the biometric image may be used.

The biometric enrollment system 110 also may store, in the database 120, the one or more biometric images linked to the similarity scores computed for the biometric images. The one or more biometric images may be stored in their captured format or may be converted into template/blob data (e.g., blocks of bytes) that represent the one or more biometric images. The biometric enrollment system 110 may store the more detailed representation of the one or more biometric images in addition to the similarity scores for verification or confirmation of search results returned through comparison of similarity scores. As an alternative approach, the images/templates can be stored in a different file system apart from the database to save the database memory and it can be related to the corresponding score through a unique identifier.

The database 120 may be any type of database that is capable of maintaining data in a sorted manner. The biometric enrollment system 110 causes enrolled biometric data to be stored in the database 120 at an appropriate location in a sorted list and controls the database 120 to maintain biometric data in a sorted manner. The similarity scores computed by the biometric enrollment system 110 may be used to sort the biometric data in the database 120. For example, the biometric data in the database 120 may be sorted as a list of similarity scores arranged in ascending or descending order.

The biometric verification system 130 verifies biometric data of a person by searching the database 120. Specifically, the biometric verification system 130 accesses (e.g., captures) biometric data for a person, converts the biometric data to a numeric value, and uses the numeric value to search the database 120.

The biometric verification system 130 may include one or more devices that capture different types of biometric images of at least a portion of a person. For instance, the biometric verification system 130 may include a iris scanner that captures an iris image of a person, a camera that captures a facial image of a person, and a fingerprint scanner that captures images of a person's fingerprints. The biometric verification system 130 may use one or more devices to capture one or more biometric images of a person being verified.

After accessing a biometric image, the biometric verification system 130 converts the biometric image into a numeric value that represents content in the biometric image. The numeric value may be computed in the same manner as numeric values of biometric images enrolled in the system 100 by the biometric enrollment system 110. For example, to generate the numeric value, the biometric verification system 130 may compute a similarity score that represents similarity of the biometric image to the reference image used for all people enrolled in the system 100. The biometric verification system 130 then may use the computed similarity score to search the database 120.

In some examples, the person providing biometric input (e.g., biometric images of the person captured at the current time or biometric images of the person presented on an identification card) may be providing the biometric input to verify that the person is actually a specific person enrolled in the system 100. In these examples, the biometric verification system 130 also may receive a user identification number for the specific person. To perform the verification, the biometric verification system 130 converts a biometric image of the person to a similarity score and uses the user identification number to access, from the database 120, a similarity score for the specific person enrolled in the system. The biometric verification system 130 then compares the converted similarity score to the accessed similarity score and determines whether the converted similarity score matches the accessed similarity score (e.g., determines whether the converted similarity score is identical to or within a threshold of the accessed similarity score). When the converted similarity score matches the accessed similarity score, the biometric verification system 130 may verify that the person is actually the specific person or may trigger a process to consider more detailed biometric information (e.g., template data of the biometric image) for higher confidence verification. When the converted similarity score does not match the accessed similarity score, the biometric verification system 130 may verify that the person is not the specific person.

In some implementations, the person providing biometric input (e.g., biometric images of the person captured at the current time or biometric images of the person presented on an identification card) may be unknown or not be associated with other identifying information. In these implementations, the biometric verification system 130 converts a biometric image of the person to a similarity score and uses the converted similarity score to search the sorted list of similarity scores in the database 120. The biometric verification system 130 may use a search process that leverages knowledge of how the similarity scores are sorted in the database 120 to search the biometric data in the database 120 more quickly. For instance, the biometric verification system 130 may perform a binary search of the database 120 using the converted similarity score, which results in half of the potential matches being eliminated with each comparison. Based on the searching, the biometric verification system 130 either identifies the person providing biometric input or indicates that the person providing biometric input is not enrolled in the system 100. In this regard, the biometric verification system 130 may be able to quickly identify a person using one or more biometric images of the person.

Figure 2:
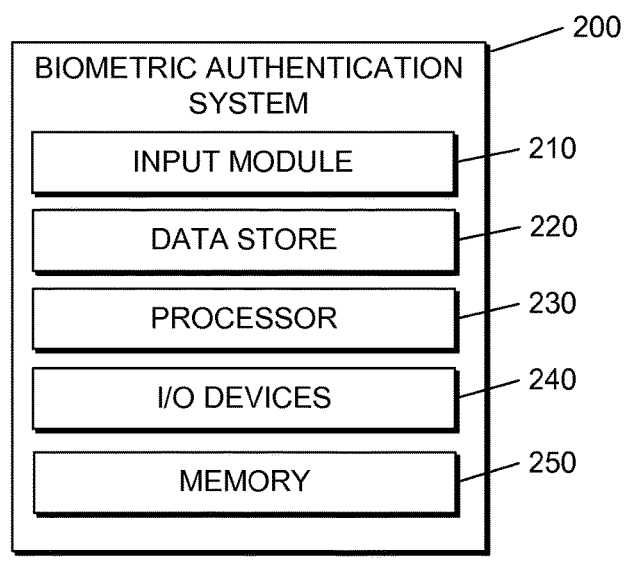

FIG. 2 illustrates an exemplary biometric authentication system 200. The system 200 includes an input module 210, a data store 220, one or more processors 230, one or more I/O (Input/Output) devices 240, and memory 250. The input module 220 may be used to input any type of information used in enrolling and verifying biometric data. For example, the input module 210 may be used to receive new biometric data to enroll in a database or receive sample biometric data to verify against biometric data stored in a database. In some implementations, data from the input module 210 is stored in the data store 220. The data included in the data store 220 may include, for example, any type of biometric data (e.g., images or templates of irises, fingerprints, faces, etc.) and similarity scores computed for biometric data. The similarity scores may be used to sort biometric data in the data store 220 using techniques described throughout this disclosure.

In some examples, the data store 220 may be a relational database that logically organizes data into a series of database tables. Each database table in the data store 220 may arrange data in a series of columns (where each column represents an attribute of the data stored in the database) and rows (where each row represents attribute values). In some implementations, the data store 220 may be an object-oriented database that logically or physically organizes data into a series of objects. Each object may be associated with a series of attribute values. In some examples, the data store 220 may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The processor 230 may be a processor suitable for the execution of a computer program such as a general or special purpose microprocessor, and any one or more processors of any kind of digital computer. In some implementations, the system 200 includes more than one processor 230. The processor 230 may receive instructions and data from the memory 250. The memory 250 may store instructions and data corresponding to any or all of the components of the system 200. The memory 250 may include read-only memory, random-access memory, or both.

The I/O devices 240 are configured to provide input to and output from the system 200. For example, the I/O devices 240 may include a mouse, a keyboard, a stylus, or any other device that allows the input of data. The I/O devices 240 may also include a display, a printer, or any other device that outputs data.

Figure 3:
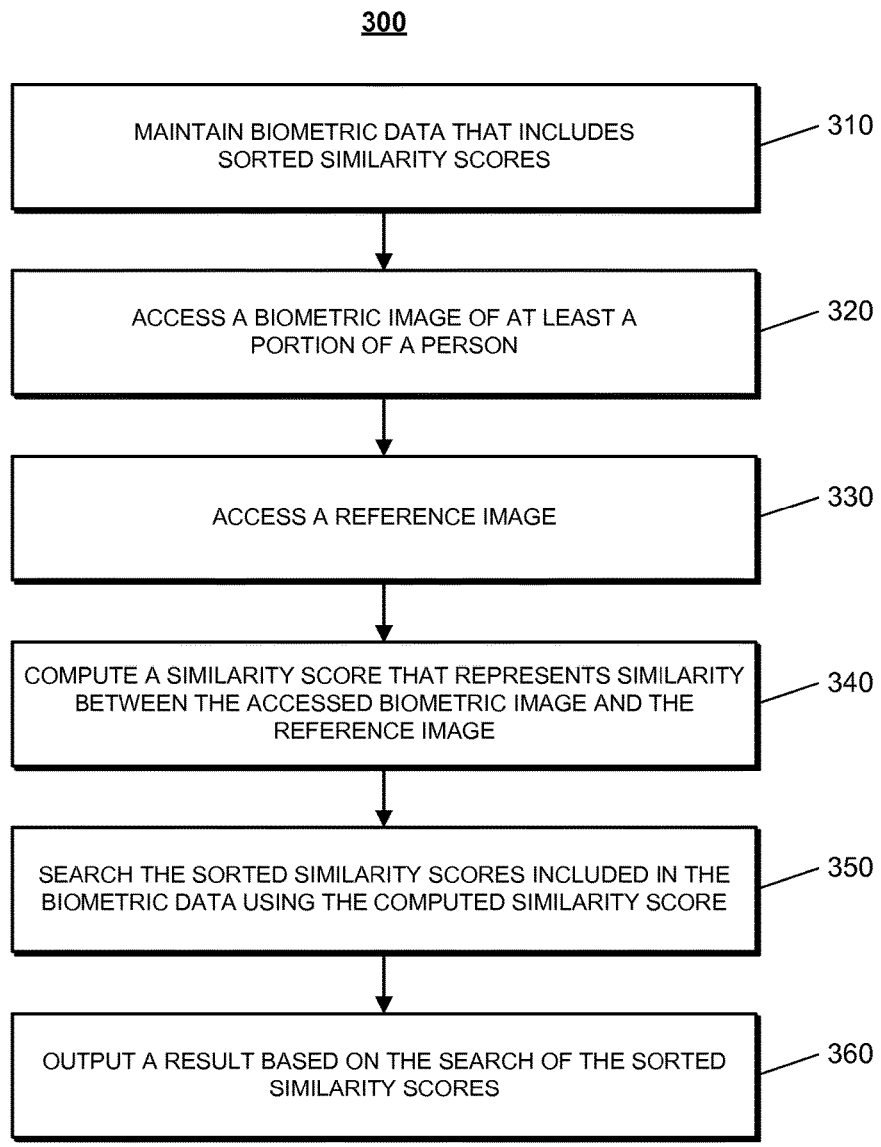
FIGS. 3, 4, and 6-8 are flowcharts of exemplary processes.

FIG. 3 illustrates a process 300 for performing biometric authentication. The operations of the process 300 are described generally as being performed by the system 200. In some implementations, operations of the process 300 may be performed by one or more processors included in one or more electronic devices.

The system 200 maintains, for a group of people, biometric data that includes sorted similarity scores (310). For instance, the system 300 accesses similarity scores for each entry of biometric data and stores the similarity scores in a sorted manner. Each of the similarity scores may be a number and may be computed to represent similarity between a biometric image and a reference image. The reference image may be used in computing all of the similarity scores such that each similarity score reflects how close the corresponding biometric image is to the reference image. The similarity scores may be computed using any type of process that outputs a numeric value that reflects how similar a first image is to a second image. The same process may be used to compute all similarity scores or multiple, different processes may be used as long as the similarity scores are normalized to a specific range.

In some examples, the similarity scores may be normalized to a value between zero and one. In these examples, similarity scores that are close to one are relatively similar to the reference image and similarity scores that are close to zero are relatively dissimilar to the reference image. The similarity scores may be sorted in ascending or descending order to define a sorted list of similarity scores. The sorting is meaningful because the similarity scores are computed in reference to the reference image and reflect how similar biometric images corresponding to the similarity scores are to one another. The similarity scores may have any number of decimal points, with a number of decimal points being chosen based on the accuracy of the process used to compute the similarity scores and number of entries of biometric data that need to be sorted.

Figure 4:
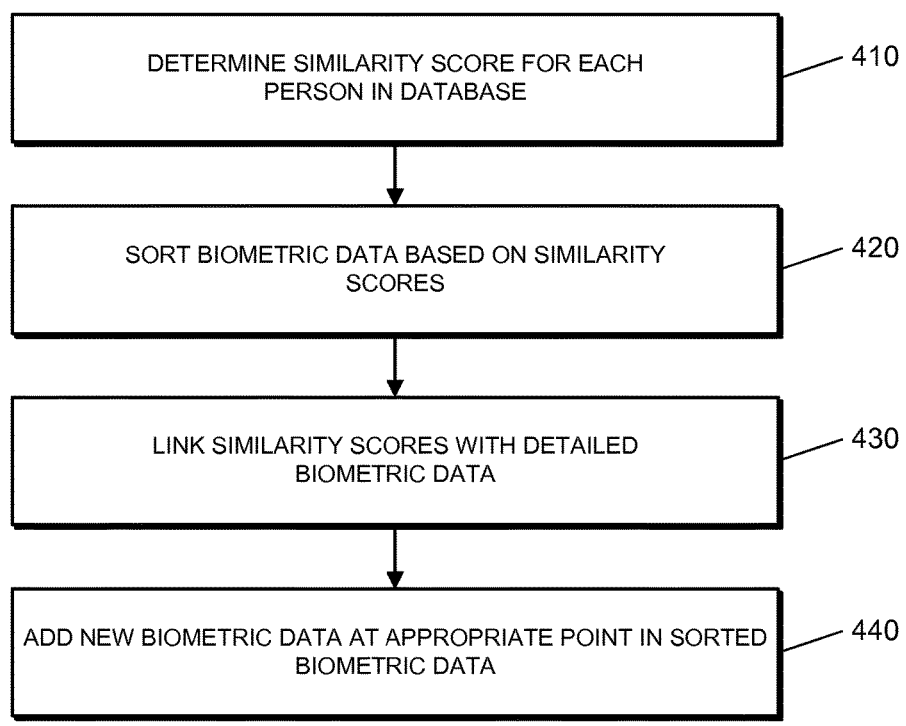

FIG. 4 illustrates a process 400 for maintaining biometric data. The process 400 may be used in maintaining biometric data that includes sorted similarity scores referenced above with respect to reference numeral 310. The operations of the process 400 are described generally as being performed by the system 200. In some implementations, operations of the process 400 may be performed by one or more processors included in one or more electronic devices.

The system 200 determines a similarity score for each person in a biometric database (410). For example, the system 200 determines, for each person in a group of people, a similarity score that represents similarity between a biometric image of at least a portion of the corresponding person and the reference image. In this example, the system 200 may compute the similarity scores or access previously-computed similarity scores. In addition, the biometric images and the reference image correspond to the same type of biometric data. For instance, the biometric images may be images of irises of people (e.g., iris scans) and the reference image may be an image of an iris of a reference person (e.g., iris scan of the reference person). Any type of biometric images and corresponding reference images may be used, including one or more of a left eye iris image, a right eye iris image, a facial image, and images of fingerprints for any of a person's fingers.

The system 200 sorts biometric data based on similarity scores (420). For instance, after determining the similarity scores, the system 200 orders the similarity scores into a sorted list. In sorting the similarity scores, the system 200 may use any type of technique to sort numeric values, such as by sorting the similarity scores in ascending or descending order. Knowledge of how the numeric values are sorted may be stored (or considered in generating a search process) such that the sorting may be leveraged in searching the similarity scores.

The system 200 links similarity scores with detailed biometric data (430). For example, the detailed biometric data may be stored for each person in a group of people. In this example, the detailed biometric data includes data that is more descriptive of the biometric image of the portion of the corresponding person than the similarity score for the corresponding person. The detailed biometric data also has a greater storage size than the similarity score for the corresponding person. The detailed biometric data may be the biometric image from which the corresponding similarity score was computed or template/blob data descriptive of the biometric image from which the corresponding similarity score was computed. Any type of biometric image data used in traditional biometric authentication may be used as the detailed biometric data.

The system 200 links, for each person in the group of people, the similarity score for the corresponding person with the detailed biometric data for the corresponding person. For instance, the system 200 associates unique identifiers with both the similarity scores and the detailed biometric data such that the unique identifiers may be used to link each similarity score to the relevant detailed biometric data. The system 200 also may store a pointer to relevant detailed biometric data in association with each similarity score or store similarity scores and corresponding detailed biometric data in a single record. By linking the similarity scores with detailed biometric data, the system 200 maintains the detailed biometric data, which is difficult to sort in a meaningful way, in a sorted manner based on the sorting of the similarity scores.

Figure 5:
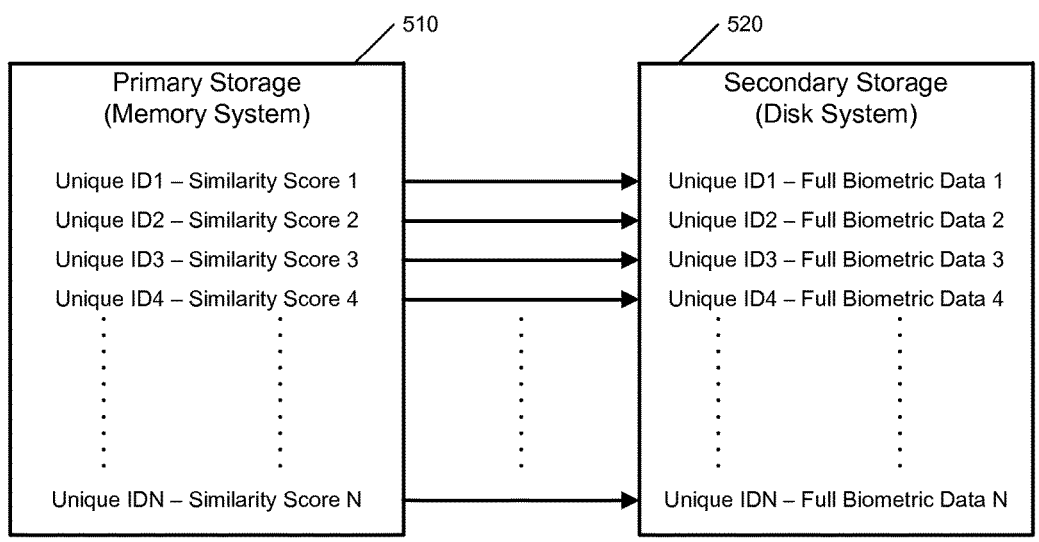
FIG. 5 illustrates an exemplary data storage system.

FIG. 5 illustrates an example data storage system that may be used for maintaining sorted biometric data. As shown, the data storage system includes a primary storage system 510 and a secondary storage system 520. The primary storage system 510 may be a memory storage system that stores similarity scores in association with unique identifiers. The secondary storage system 520 may be a disk storage system that stores full biometric data (e.g., biometric images or template/blob data representative of biometric images) in association with unique identifiers.

The memory storage system may be used for the similarity scores because the similarity scores are of a significantly smaller storage size than the full biometric data. The memory storage system may have faster access times than the disk storage system, but also may be more expensive. Accordingly, the disk storage system may have a larger capacity than the memory storage system and the full biometric data may be stored in the disk storage system and only accessed after the similarity scores have been searched in the memory storage system.

As shown in FIG. 5, the similarity scores stored in the primary storage system 510 are linked to the full biometric data stored in the secondary storage system 520. The linking is achieved through the use of unique identifiers with each unique identifier being associated with one similarity score and one item of full biometric data for a single sub-modality. When full biometric data for a similarity score is desired, the unique identifier associated with the similarity score is accessed and used to search the secondary storage system 520 and identify the relevant full biometric data. In this regard, the secondary storage system 520 may be accessed after the search of the similarity scores has already narrowed down the potential matches to a subset of one or more.

Referring again to FIG. 4, the system 200 adds new biometric data at an appropriate point in the sorted biometric data (440). For instance, the system 200 inserts a new similarity score and corresponding new biometric image in the sorted biometric data at a location that maintains the biometric data in a sorted manner. The system 200 may find a closest match to the new similarity score and compute a difference between the new similarity score and the closest match. If the difference is greater than zero and the similarity scores are sorted in descending order, the system 200 inserts the new biometric data (e.g., new similarity score and new biometric image) before the closest match in the sorted biometric data. In this regard, the system 200 may place the new similarity score immediately prior to the similarity score for the closest match in a sorted list of similarity scores and place the new biometric image immediately prior to the biometric image for the closest match in a sorted list of biometric images. If the difference is less than or equal to zero and the similarity scores are sorted in descending order, the system 200 inserts the new biometric data (e.g., new similarity score and new biometric image) after the closest match in the sorted biometric data. In this regard, the system 200 may place the new similarity score immediately after the similarity score for the closest match in the sorted list of similarity scores and place the new biometric image immediately after the biometric image for the closest match in the sorted list of biometric images.

In some implementations, to enroll a new person, the system 200 accesses a new biometric image of at least a portion of the new person and accesses the reference image. In these implementations, the system 200 computes a new similarity score that represents similarity between the new biometric image and the reference image and determines a unique identifier for the new person. The system 200 then stores, in a data storage system and in association with the unique identifier, the new similarity score at an appropriate point in the sorted similarity scores. The system 200 also stores, in the data storage system and in association with the unique identifier, detailed biometric data for the new person. The detailed biometric data for the new person may be more descriptive of the new biometric image than the new similarity score and may have a greater storage size than the new similarity score. For example, the detailed biometric data for the new person may include the new biometric image or template/blob data representing the new biometric image.

Referring again to FIG. 3, the system 200 accesses a biometric image of at least a portion of a person (320). For example, the system 200 receives a biometric image of a person's body part, such as a left iris image, a right iris image, a facial image, an image of any one or more of the person's fingerprints, an image of the person's handprint, etc. In this example, the system 200 may include or communicate with one or more devices that capture biometric images of a person. The one or more devices may include iris scanners, cameras, fingerprint scanners, hand scanners, or any other type of device capable of capturing a biometric image of a person. The system 200 may access the output of any of the one or more devices as the biometric image, in a traditional image format, such as bmp, jpeg, tiff, png, etc.

In some examples, the system 200 accesses the biometric image from electronic storage. In these examples, biometric images may be captured over time at a location separate from the system 200 and stored for later processing and identification. The system 200 also may receive the biometric image over a network.

The system 200 accesses the reference image (330). For instance, the system 200 accesses the reference image from electronic storage. The reference image may be an image of a body part of a reference person that corresponds to the body part imaged in the accessed biometric image. The reference image may be of any reference person as long as the reference image is used in calculating similarity scores for all similarity scores being searched. Other types of reference images may be used.

In some implementations, the system 200 may determine a type of the accessed biometric image and access a reference image of the same type. The type may refer to a particular sub-modality, such as left-iris, right-iris, index-finger, middle-finger, etc. In these implementations, the system 200 may store multiple reference images and select the reference image that corresponds to the same body part imaged in the accessed biometric image. For example, the system 200 may store a left iris reference image, a right iris reference image, a facial reference image, and ten fingerprint reference images that each correspond to a particular finger of a person. In this example, the system 200 may determine the accessed biometric image is of a right iris and access the right iris reference image based on the determination that the accessed biometric image is of a right iris.

The system 200 computes a similarity score that represents similarity between the accessed biometric image and the reference image (340). For example, the system 200 may compare the accessed biometric image with the reference image and generate a numeric value that reflects similarity between the accessed biometric image and the reference image. In this example, the system 200 may compute the similarity scores between the two templates extracted from the two images. The resulting score reflects the similarity between the accessed biometric image and the reference image in that the score is closer to zero depending how similar the accessed biometric image is to the reference image (i.e., the score would be zero for same images and near to zero for identical images). Any type of process for computing a similarity score (e.g., numeric value) that reflects similarity between two images may be used. For example, to compute a similarity score between two left-iris images, a method for iris matching using zero crossings of a one dimensional Discrete Cosine Transform (DCT) may be used to perform feature extraction for later classification. This iris coding method is based on differences of discrete cosine transform (DCT) coefficients of overlapped angular patches from normalized iris images. The DCT of a series of averaged overlapping angular patches are taken from normalized iris images and a small subset of coefficients is used to form subfeature vectors. Iris codes are generated as a sequence of many such subfeatures, and classification is carried out using a weighted Hamming distance metric. This technique is described in more detail in 'DCT-based iris recognition', by D. M. Monro, S. Rakshit and D. Zhang, published in IEEE Transactions on Pattern Analysis an d Machine Intelligence, Vol. 29, No. 4, pp. 586-595, April 2007.

In some examples, the system 200 may access multiple biometric images of the portion of the person (e.g., multiple left iris images) and compute, for each of the multiple biometric images, a similarity score that represents similarity between the corresponding biometric image and the reference image. In these examples, the system 200 may determine an average similarity score or median similarity score based on the similarity scores computed for the multiple biometric images. Using multiple biometric images of the portion of the person may provide a more accurate similarity score and may account of slight differences in position when capturing biometric images of the person as compared to position in the reference.

In some implementations, the system 200 may use one or more image similarity processes to generate a similarity measure between the accessed biometric image and the reference image. In these implementations, the system 200 may normalize the similarity measure to a similarity score between zero and one. Normalization allows the system 200 to use a similarity process that produces a measure outside of a desired scale. In addition, normalization may allow different similarity processes with different output ranges to be used and may allow for changes in the similarity process as long as the normalization is adjusted to compute similarity scores within the desired range (e.g., zero to one).

The system 200 searches the sorted similarity scores included in the biometric data using the computed similarity score (350). For instance, the system 200 compares the computed similarity score to the sorted similarity scores and identifies one or more matches based on the comparison. The system 200 may identify a closest match to the computed similarity score and/or may identify a group of people having similarity scores within a threshold of the computed similarity score. Searching based on a similarity score may improve the speed of searching biometric data over traditional techniques that search based on a comparison of more detailed data.

In some implementations, the system 200 may search the sorted similarity scores in a manner that leverages knowledge of how the similarity scores included in the biometric data are sorted. In these implementations, the system 200 may perform a binary search of the sorted similarity scores using the computed similarity score. For example, the similarity scores included in the biometric data may be sorted in a list in descending order. In this example, the system 200 compares the computed similarity score to a similarity score at a central point in the sorted list. If the comparison reveals that the computed similarity score is more than a threshold greater than the similarity score at the central point in the sorted list, the system 200 discards a bottom half of the sorted list and moves to a similarity score at a central point in the remaining portion (e.g., upper half) of the sorted list. If the comparison reveals that the computed similarity score is more than the threshold less than the similarity score at the central point in the sorted list, the system 200 discards an upper half of the sorted list and moves to a similarity score at a central point in the remaining portion (e.g., bottom half) of the sorted list. The system 200 continues to search the sorted list in half intervals until one or more matches that are within the threshold of the computed similarity score are located. Because the system 200 knows that the similarity scores are sorted in a list in descending order, the system 200 is able to discard relatively large portions of the sorted list with a single comparison and without the need to compare the computed similarity score to all of the similarity scores included in the biometric data. Any type of search process that leverages knowledge of how data is sorted may be used by the system 200 to search the sorted similarity scores. For example, a binary search method can be used that is based on the linear ordering of keys, such as alphabetic order or numeric order. In some examples, the numeric order may be used when searching a list of similarity scores which are numbers. In this example, a given input argument K (e.g., a similarity score) is compared to a middle key Kx in the sorted list and the result of this comparison tells which half of the table should be searched next. The result can be one of the three possible scenarios –K<Kx, K=Kx or K>Kx. In case K=Kx, a match is identified. If K<Kx, all of the elements in the table with keys greater than Kx are discarded. Similarly, if K>Kx, all of the elements in the table with keys less than Kx are discarded. Thus, in each iteration of the search, half of the table is eliminated and hence the search is completed in log N time. A more detailed explanation of the binary search process is given in 'The Art of Computer Programming', Volume 3: Sorting and Searching, Third Edition. Addison-Wesley, 1997. ISBN 0-201-89685-0. Section 6.2.1: Searching an Ordered Table, pp. 409-426 by 'Donald Knuth'.

The system 200 outputs a result based on the search of the sorted similarity scores included in the biometric data using the computed similarity score (360). For instance, the system 200 displays a result of the search (e.g., one or more matches identified through searching), stores the result of the search in electronic storage, sends the result of the search in an electronic communication (e.g., an electronic mail message), prints a copy of the result of the search using a printing device, sends the result of the search to another process for additional processing, or performs any other output operation that allows a user to perceive the result of the search and/or that allows the result of the search to be used in further authentication processing.

Figure 6:
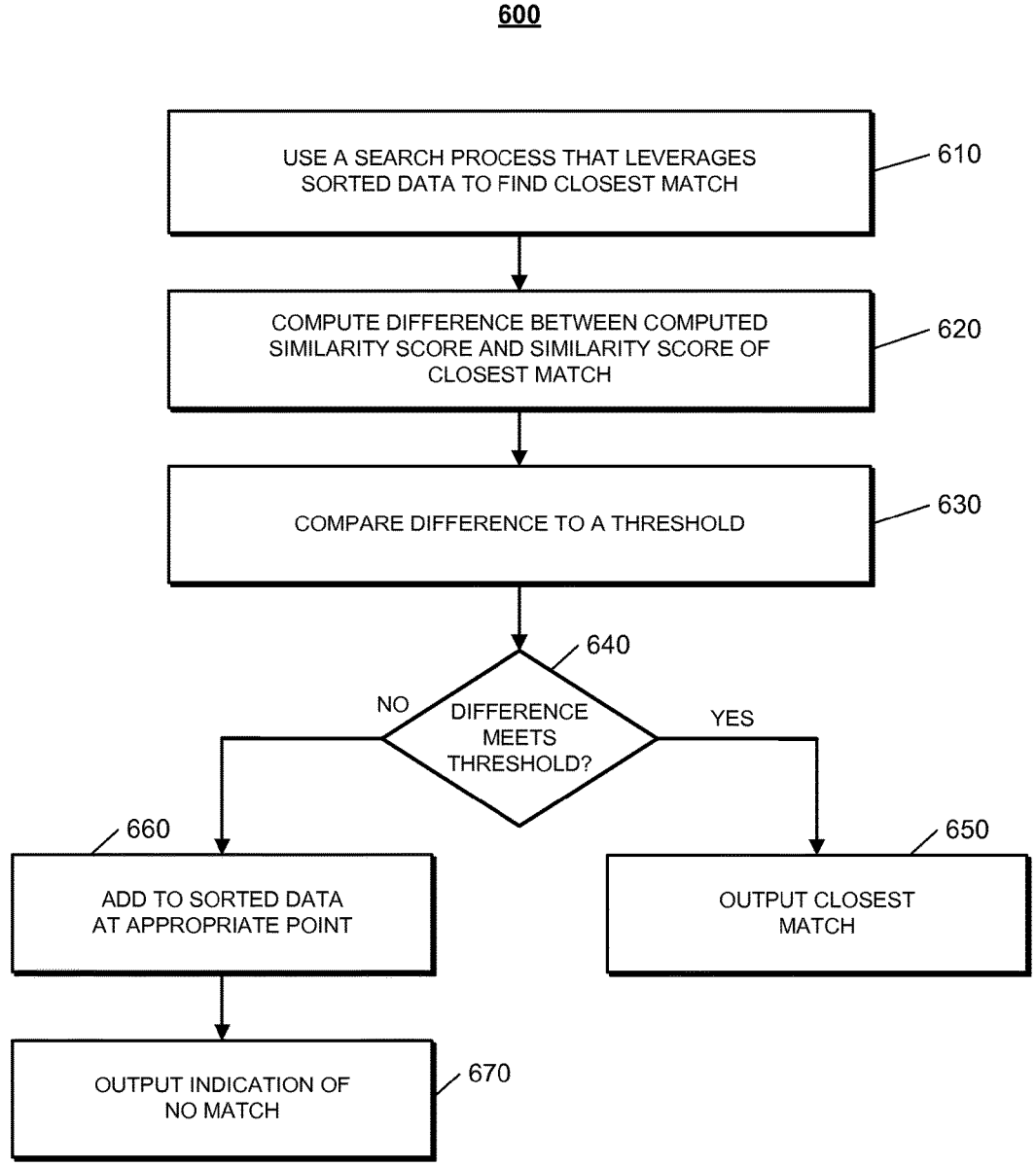

FIG. 6 illustrates a process 600 for searching biometric data. The process 600 may be used in searching sorted similarity scores and outputting a result referenced above with respect to reference numerals 350 and 360. The operations of the process 600 are described generally as being performed by the system 200. In some implementations, operations of the process 600 may be performed by one or more processors included in one or more electronic devices.

The system 200 uses a search process that leverages sorted data to find a closest match (610). For example, the system 200 uses knowledge of how the similarity scores are sorted (e.g., ascending or descending order) to search the similarity scores in a manner that is faster than comparing the computed similarity score to each potential match until a match is found. In this example, the system 200 may discard multiple potential matches (perhaps many potential matches) with a single comparison based on the knowledge of how the similarity scores are sorted. A binary search process or any other search process described throughout this disclosure may be used.

In the example shown in FIG. 6, the system 200 identifies the closest match based on the searching. The closest match is the similarity score in the biometric data that is closest to the computed similarity score. The system 200 may identify the closest match by identifying the similarity score with the minimum absolute difference from the computed similarity score. If the similarity scores were not sorted, the system 200 would have to compare the computed similarity score against all of the similarity scores to ensure the closest match is found. However, because the similarity scores are sorted, the system 200 may find the closest match more quickly by discarding multiple similarity scores using a single comparison and knowledge of how the similarity scores are sorted.

The system 200 computes a difference between the computed similarity score and a similarity score of the closest match (620). For instance, the system 200 accesses the similarity score of the closest match and subtracts the computed similarity score from the similarity score of the closest match. The system 200 may determine an absolute value of the result of the subtraction.

The system 200 compares the difference to a threshold (630) and determines whether the difference is within the threshold based on comparison results (640). For example, the system 200 accesses a threshold value from electronic storage and compares the difference to the accessed threshold. In this example, the system 200 determines whether the difference meets the accessed threshold based on the comparison. When the computed difference is an absolute difference, the threshold may be a single value (e.g., 0.01). In this case, the system 200 may determine that the difference is within the threshold when the comparison reveals that the absolute difference is less than or equal to the threshold value and determine that the difference is outside of the threshold when the comparison reveals that the absolute difference is greater than the threshold value. When the computed difference is not an absolute difference, the threshold may be a range (e.g., –0.01 to 0.01). In this case, the system 200 may determine that the difference is within the threshold when the comparison reveals that the difference is within the range and determine that the difference is outside of the threshold when the comparison reveals that the difference is outside of the range.

The system 200 outputs the closest match based on a determination that the difference is within the threshold (650). For instance, when the system 200 determines that the difference is within the threshold, the system 200 outputs the closest match. The output may include the similarity score for the closest match, more detailed biometric data for the person associated with the closest match, and/or identification information (e.g., user identification number, name, etc.) for the person associated with the closest match. The system 200 may display the output, store the output in electronic storage, send the output in an electronic communication (e.g., an electronic mail message), print a copy of the output using a printing device, or perform any other output operation that allows a user to perceive the output and/or that allows the output to be used in further authentication processing.

Based on a determination that the difference is not within the threshold, the system 200 adds the computed similarity score at an appropriate point in the sorted similarity scores (660) and outputs an indication that a match was not found (670). For example, the system 200 may determine whether the computed similarity score is greater than or less than the similarity score of the closest match. When the similarity scores are sorted in descending order, the system 200 adds, in the sorted list of similarity scores, the computed similarity score immediately prior to the similarity score of the closest match when the system 200 determines that the computed similarity score is greater than the similarity score of the closest match. The system 200 adds, in the sorted list of similarity scores, the computed similarity score immediately after the similarity score of the closest match when the system 200 determines that the computed similarity score is less than the similarity score of the closest match. When the similarity scores are sorted in ascending order, the system 200 adds, in the sorted list of similarity scores, the computed similarity score immediately after the similarity score of the closest match when the system 200 determines that the computed similarity score is greater than the similarity score of the closest match. The system 200 adds, in the sorted list of similarity scores, the computed similarity score immediately prior to the similarity score of the closest match when the system 200 determines that the computed similarity score is less than the similarity score of the closest match.

In some examples, the system 200 also adds identification information for the person whose image was used to compute the similarity score to effectively enroll the person into the authentication system for future comparison. In these examples, the system 200 may add an identifier for the person, a name, more detailed biometric data (e.g., the accessed image used to generate the computed similarity score), and/or any other data that may be useful in performing future authentication processes for the person. The system 200 may link the computed similarity score to the identification information in the biometric data as described throughout this disclosure.

Figure 7:
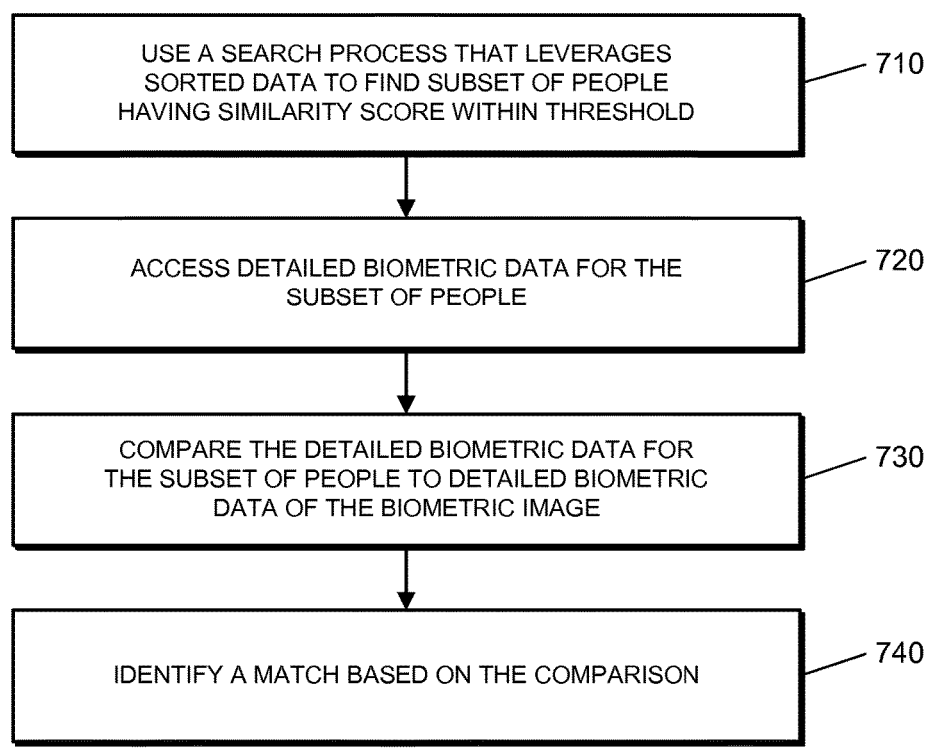

FIG. 7 illustrates a process 700 for searching biometric data. The process 700 may be used in searching sorted similarity scores and outputting a result referenced above with respect to reference numerals 350 and 360. The operations of the process 700 are described generally as being performed by the system 200. In some implementations, operations of the process 700 may be performed by one or more processors included in one or more electronic devices.

The system 200 uses a search process that leverages sorted data to find a subset of people that are each associated with a similarity score within a threshold of a computed similarity score (710). For example, the system 200 uses knowledge of how the similarity scores are sorted (e.g., ascending or descending order) to search the similarity scores in a manner that is faster than comparing the computed similarity score to each potential match to find the subset of people. In this example, the system 200 may discard multiple potential matches (perhaps many potential matches) with a single comparison based on the knowledge of how the similarity scores are sorted. A binary search process or any other search process described throughout this disclosure may be used.

In the example shown in FIG. 7, the system 200 identifies a subset of people that are each associated with a similarity score within a threshold of the computed similarity score based on the searching. The system 200 may identify the subset of people by identifying similarity scores whose absolute difference from the computed similarity score is less than or equal to the threshold. If the similarity scores were not sorted, the system 200 would have to compare the computed similarity score against all of the similarity scores to ensure each appropriate person is found. However, because the similarity scores are sorted, the system 200 may find the subset of people more quickly by discarding multiple similarity scores using a single comparison and knowledge of how the similarity scores are sorted.

The system 200 accesses detailed biometric data for the subset of the people (720). For example, the system 200 identifies detailed biometric data linked to each of the similarity scores for the subset of the people and accesses the detailed biometric data identified. In this example, the system 200 may access a user identification number for each person in the subset of the people and use the accessed user identification numbers to retrieve detailed biometric data for each person in the subset. The detailed biometric data for each person in the subset may include data that is more descriptive of the biometric image of the portion of the corresponding person than the similarity score for the corresponding person. The detailed biometric data for each person in the subset also may have a greater storage size than the similarity score for the corresponding person. The detailed biometric data may include the biometric images that were used to compute the similarity scores for the subset of the people or another representation (e.g., blob data) for the biometric images.

The system 200 compares the detailed biometric data for the subset of people to detailed biometric data for the accessed biometric image of the person (730). For instance, the system 200 may access detailed biometric data for the person and compare the detailed biometric data for the person to the detailed biometric data for each person in the subset of the people. The detailed biometric data for the person is the same type of biometric data as the detailed biometric data for the subset of the people and may be more descriptive of the biometric image of the person than the computed similarity score. The detailed biometric data for the person also may have a greater storage size than the computed similarity score. The detailed biometric data for the person may include the biometric image that was used to compute the similarity scores for the person or another representation (e.g., template/blob data) for the biometric image.

The system 200 may use any type of technique to compare the detailed biometric data for the person to the detailed biometric data for each person in the subset of the people. For instance, the system 200 may use any image matching process for that particular modality/sub-modality, to compare the detailed biometric data for the person to the detailed biometric data for each person in the subset of the people. The process can be similar to the one discussed above as an example for left-iris matching technique based on weighted Hamming Distance metric as described in 'DCT-based iris recognition', by D. M. Monro, S. Rakshit and D. Zhang, published in IEEE Transactions on Pattern Analysis and Machine Intelligence, Vol. 29, No. 4, pp. 586-595, April 2007. Because the detailed biometric data is more descriptive than the similarity scores, the comparison of the detailed biometric data may be more time consuming and more accurate than the comparison involving the similarity scores. However, the comparison involving the similarity scores may still be useful because it narrows down the potential matches to a subset of the people prior to the more detailed and time consuming process being performed. This staged approach may speed up the search process and still provide the accuracy of traditional biometric systems that perform more detailed analysis on all possible matches from the outset.

The system 200 identifies a match based on comparison results (740). For example, the system 200 analyzes results of the comparison and determines which person in the subset is the closest match. In this example, the system 200 may determine whether the closest match meets a threshold level of confidence in the match and outputs the closest match based on a determination that the closest match meets the threshold level of confidence. Based on a determination that the closest match does not meet the threshold level of confidence, the system 200 may provide output that no match exists or may provide output identifying multiple potential matches with an indication that none of the potential matches meets the threshold level of confidence.

Figure 8:
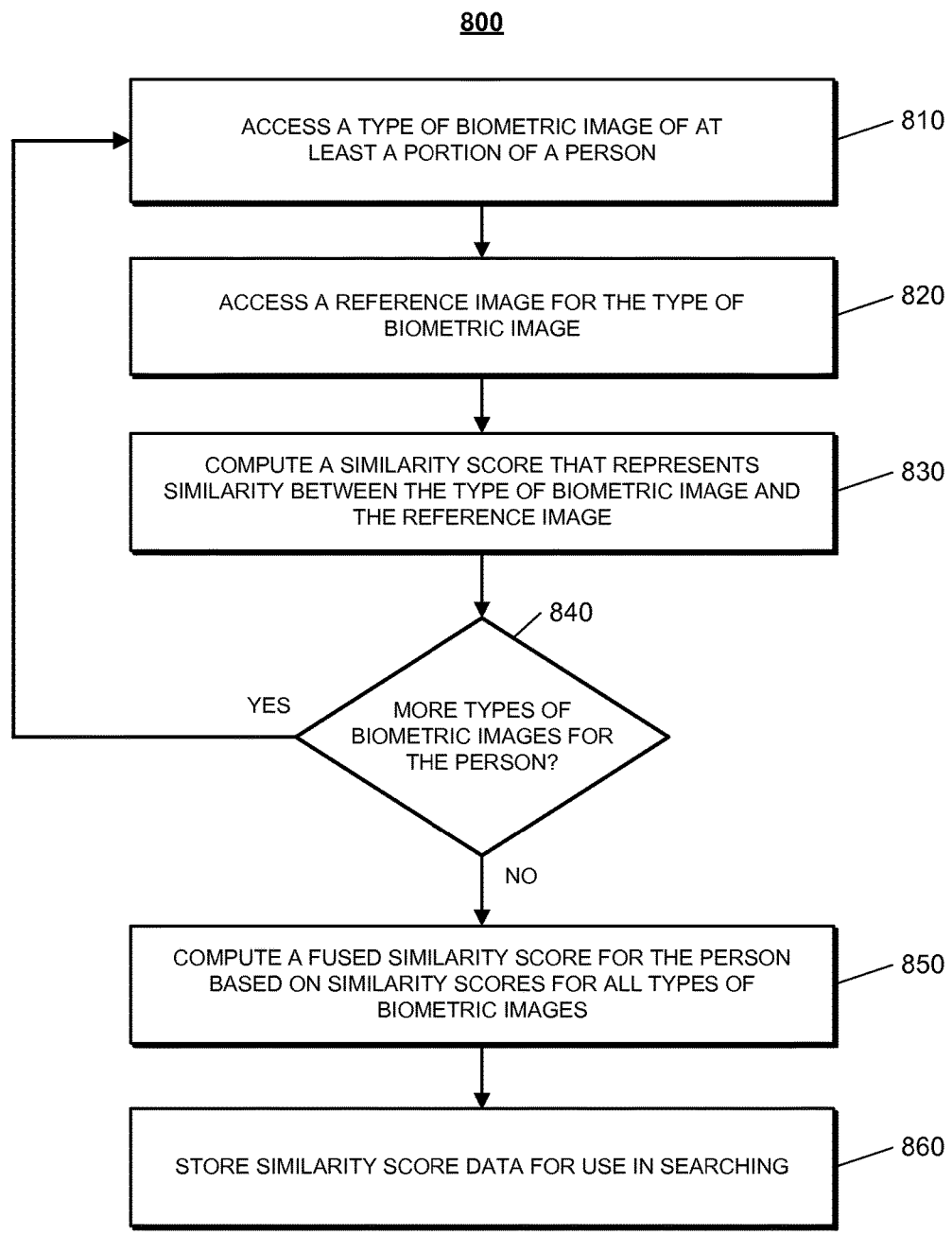

FIG. 8 illustrates a process 800 for storing biometric data that includes multiple types of biometric images. The operations of the process 800 are described generally as being performed by the system 200. In some implementations, operations of the process 800 may be performed by one or more processors included in one or more electronic devices.

The system 200 accesses multiple biometric images of the person (810). For instance, the system 200 may use techniques described above with respect to reference numeral 320 in FIG. 3 to access the multiple biometric images of the person. Each of the multiple biometric images may correspond to a different portion of the person, such as accessing any combination of two or more of a left iris image of the person, a right iris image of the person, a facial image of the person, an image of any one or more of the person's fingerprints, and an image of the person's handprint. The system 200 may access multiple biometric images when the authentication system considers multiple types of biometric images in verifying a biometric match.

The system 200 accesses multiple reference images (820). For instance, the system 200 may use techniques described above with respect to reference numeral 330 in FIG. 3 to access the multiple reference images. Each of the multiple reference images may correspond to a different portion of a person and may map to one of the multiple biometric images. For example, the system 200 may access the same combination of two or more of a left iris image of a reference person, a right iris image of a reference person, a facial image of a reference person, an image of any one or more of a reference person's fingerprints, and an image of a reference person's handprint.

The system 200 computes multiple similarity scores (830). The system 200 may use techniques described above with respect to reference numeral 340 in FIG. 3 to compute the multiple similarity scores. Each of the multiple similarity scores may represent similarity between one of the multiple biometric images and one of the multiple reference images. For instance, the system 200 may compute a left iris similarity score, a right iris similarity score, a facial similarity score, one or more similarity scores for any one or more of the person's fingerprints, and a handprint similarity score.

The system 200 computes a fused similarity score based on the multiple similarity scores (840). For example, the system 200 may combine the multiple similarity scores into a single fused similarity score (e.g., a single numeric value), which represents aggregate similarity of the multiple biometrics images to the multiple reference images. In this example, the system 200 may take a weighted average of the multiple similarity scores to produce the fused similarity score. The system 200 may set the weightings used in computing the weighted average of the multiple similarity scores based on the accuracy of each type of biometric data. For instance, iris images may be given a higher weight than facial images because iris authentication has a higher accuracy than facial authentication. In this regard, by looking at multiple types of biometric data and weighting each type based on its relative accuracy, the fused similarity score computed by the system 200 may provide more accurate results as compared to searching using a similarity score computed for a single type of biometric data.

The system 200 stores similarity score data for use in searching based on the multiple similarity scores (850). For example, the system 200 stores, in electronic storage, each of the multiple similarity scores computed and the fused similarity score computed. In this example, the system 200 may store the multiple similarity scores and the fused similarity score as a vector of similarity scores associated with identification information for the person whose images were used to compute the multiple similarity scores. The identification information may include an identifier for the person, a name, more detailed biometric data (e.g., the multiple images used to generate the multiple similarity scores), and/or any other data that may be useful in performing future authentication processes for the person. The system 200 may link the vector of similarity scores to the identification information in the biometric data as described throughout this disclosure.

Figure 9:
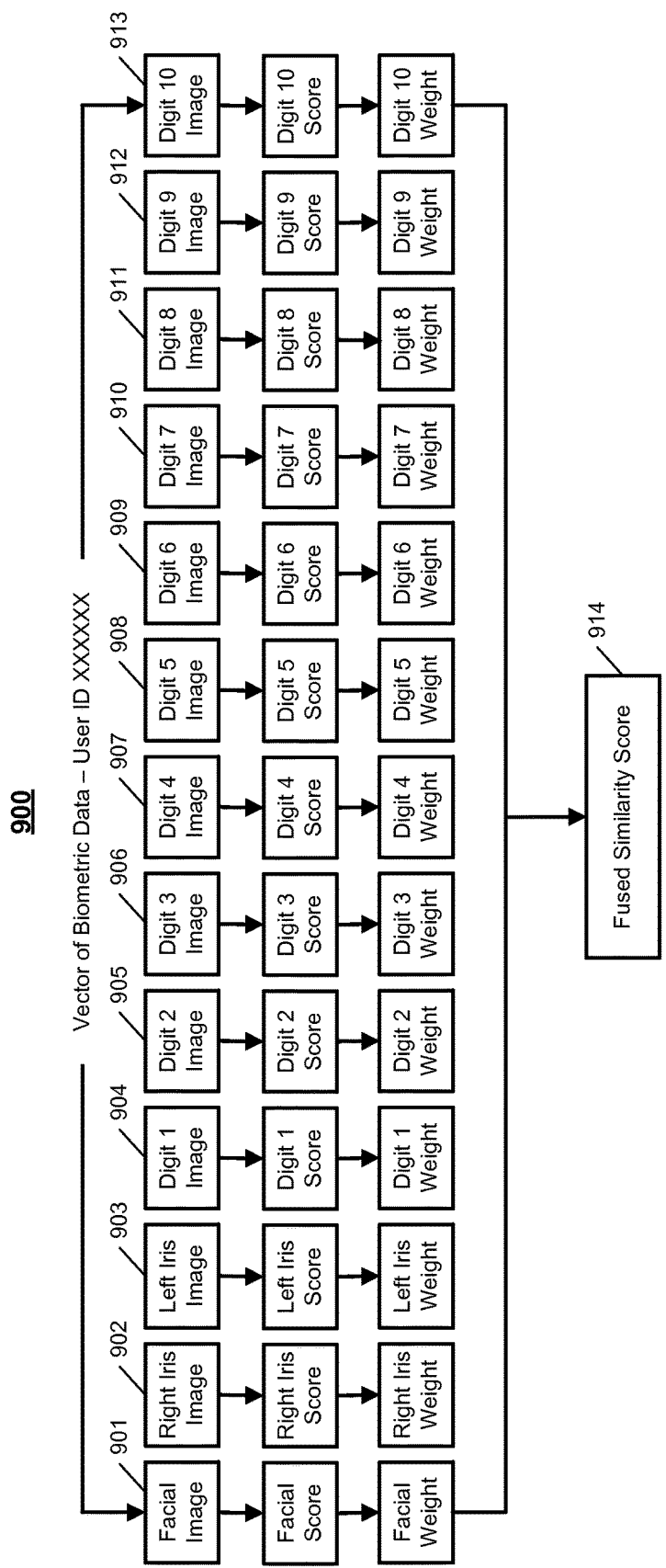
FIG. 9 illustrates an exemplary data structure for biometric data.

FIG. 9 illustrates an example data structure 900 for biometric data. The data structure 900 includes identification data for a person, detailed biometric data for the person, multiple similarity scores for the person, and a fused similarity score for the person. As shown, identification data for the person includes a user identification number (shown, for example, as XXXXXX).

The detailed biometric data for the person includes a facial image 901, a right iris image 902, a left iris image 903, a fingerprint image for a first digit 904, a fingerprint image for a second digit 905, a fingerprint image for a third digit 906, a fingerprint image for a fourth digit 907, a fingerprint image for a fifth digit 908, a fingerprint image for a sixth digit 909, a fingerprint image for a seventh digit 910, a fingerprint image for an eighth digit 911, a fingerprint image for a ninth digit 912, and a fingerprint image for a tenth digit 913. The multiple similarity scores for the person include a facial similarity score computed based on the facial image 901, a right iris similarity score computed based on the right iris image 902, a left iris similarity score computed based on the left iris image 903, a first digit similarity score computed based on the fingerprint image for the first digit 904, a second digit similarity score computed based on the fingerprint image for the second digit 905, a third digit similarity score computed based on the fingerprint image for the third digit 906, a fourth digit similarity score computed based on the fingerprint image for the fourth digit 907, a fifth digit similarity score computed based on the fingerprint image for the fifth digit 908, a sixth digit similarity score computed based on the fingerprint image for the sixth digit 909, a seventh digit similarity score computed based on the fingerprint image for the seventh digit 910, an eighth digit similarity score computed based on the fingerprint image for the eighth digit 911, a ninth digit similarity score computed based on the fingerprint image for the ninth digit 912, and a tenth digit similarity score computed based on the fingerprint image for the tenth digit 913.

The fused similarity score 914 is computed by taking a weighted average of the facial similarity score, the right iris similarity score, the left iris similarity score, the first digit similarity score, the second digit similarity score, the third digit similarity score, the fourth digit similarity score, the fifth digit similarity score, the sixth digit similarity score, the seventh digit similarity score, the eighth digit similarity score, the ninth digit similarity score, and the tenth digit similarity score. As shown, the weighted average is computed based on variable weights associated with each type of biometric data. The weights include a facial weight, a right iris weight, a left iris weight, a first digit weight, a second digit weight, a third digit weight, a fourth digit weight, a fifth digit weight, a sixth digit weight, a seventh digit weight, an eighth digit weight, a ninth digit weight, and a tenth digit weight.

The data structure 900 represents a vector of multiple types of biometric data that provides a profile of several sources for identifying the person using biometric identification techniques. Because the vector includes multiple types of biometric data, the vector may provide increased accuracy in searching for a person using biometric data.

In some implementations, the system 200 may leverage multiple types of biometric data in performing a search of biometric data. In these implementations, the system 200 may compute a similarity score for each of the multiple types of biometric data and perform a search based on the computed similarity scores. For instance, when the system 200 computes a fused similarity score based on the computed similarity scores for the multiple types of biometric data, the system 200 may use the fused similarity score to perform any of the search processes described throughout this disclosure that use a computed similarity score.

Further, the system 200 may use a staged searching process that uses multiple searches of different types of similarity scores to incrementally narrow down results. For example, the system 200 may first use a fused similarity score for a person to identify a first subset of people that each has a fused similarity score within a threshold of the fused similarity score for the person. In this example, the system 200 then may compare a left iris similarity score for the person to left iris similarity scores of the first subset of people and, based on the comparison, narrow the first subset of people down to a second subset of people that have both a fused similarity score within a threshold of the fused similarity score for the person and a left iris similarity score within a threshold of the left iris similarity score for the person. The system 200 then may compare a right iris similarity score for the person to right iris similarity scores of the second subset of people and, based on the comparison, narrow the second subset of people down to a third subset of people that have a fused similarity score within a threshold of the fused similarity score for the person, a left iris similarity score within a threshold of the left iris similarity score for the person, and a right iris similarity score within a threshold of the right iris similarity score for the person. The system 200 may continue to narrow down the results until a single match has been found (or a suitable number of matches to move to more detailed biometric identification techniques) or all types of biometric data have been considered. Any combination and order of searching similarity scores may be used in performing a staged searching process.

In some examples, the system 200 may perform multiple searches of different types of similarity scores simultaneously. In these examples, for each type of similarity score, the system 200 may identify a subset of people that have a similarity score for the type of similarity score that is within a threshold of a similarity score of a person for the type of similarity score. Accordingly, the system 200 identifies a subset of people for each type of similarity score. The system 200 then analyzes the different subsets of people to identify a final subset of people that are common to all of the different subsets of people. The system 200 then outputs the final subset of people as a result or performs more detailed biometric identification techniques for the final subset of people.

Figure 10:
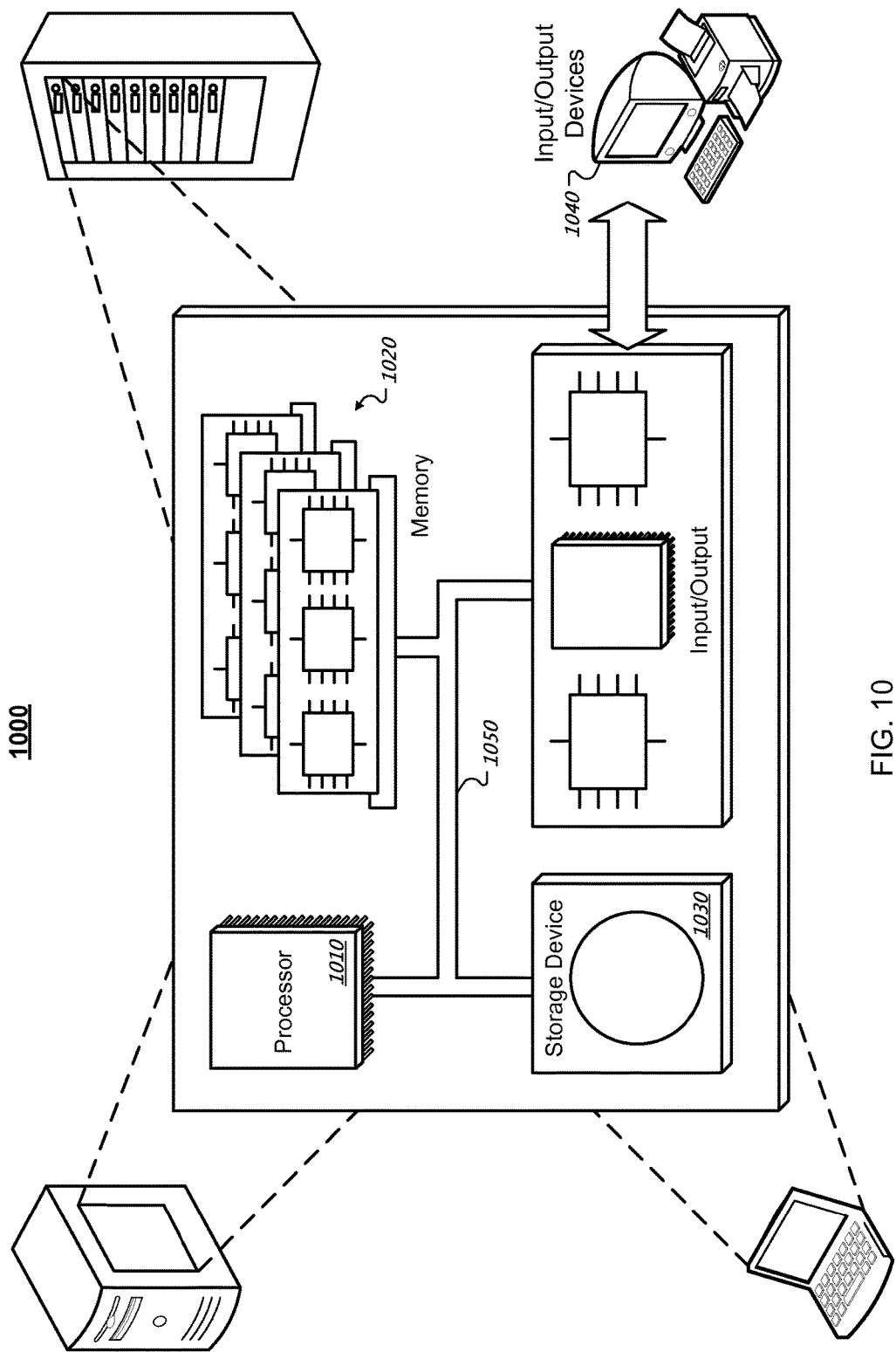

FIG. 10 is a schematic diagram of an example of a generic computer system 1000. The system 1000 can be used for the operations described in association with the processes 300, 400, 600, 700, and 800, according to some implementations. The system 1000 may be included in the systems 100 and 200.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A biometric authentication system comprising:
   a data storage system configured to maintain, for a group of multiple, different people, biometric data that includes sorted similarity scores, wherein each similarity score represents a similarity between a biometric image of at least a portion of a corresponding person from the group of multiple, different people and a reference image; and
   a biometric verification system that includes at least one processor, the biometric verification system being configured to:
      access data for a particular biometric image of at least a portion of a particular person;
      compute a particular similarity score that represents similarity between the particular biometric image and the reference image used in computing the similarity scores for each person in the group of multiple, different people;
      search, using the computed particular similarity score, the sorted similarity scores included in the biometric data for the group of multiple, different people to find a closest match to the computed particular similarity score in the sorted similarity scores;
      compute a difference between the computed particular similarity score and a similarity score of the closest match;
      determine whether the difference satisfies a threshold difference value; and
      output the closest match based on a determination that the difference satisfies the threshold difference value.

2. The biometric authentication system of claim 1, wherein the biometric verification system is configured to search the sorted similarity scores included in the biometric data using the computed particular similarity score by searching the sorted similarity scores in a manner that leverages knowledge of how the similarity scores included in the biometric data are sorted.

3. The biometric authentication system of claim 2, wherein the biometric verification system is configured to search the sorted similarity scores in a manner that leverages knowledge of how the similarity scores included in the biometric data are sorted by performing a binary search of the sorted similarity scores using the computed particular similarity score.

4. The biometric authentication system of claim 1:
   wherein the biometric verification system is configured to access the data for the particular biometric image of at least the portion of the particular person by accessing data for an image of an iris of the particular person; and
   wherein the biometric verification system is configured to compute the particular similarity score that represents similarity between the particular biometric image and the reference image by computing a similarity score that represents similarity between the image of the iris of the particular person and the reference image of the iris of the reference person.

5. The biometric authentication system of claim 1:
   wherein the biometric verification system is configured to access the data for the particular biometric image of at least the portion of the particular person by accessing data for an image of a fingerprint of the particular person; and
   wherein the biometric verification system is configured to compute the particular similarity score that represents similarity between the particular biometric image and the reference image by computing a similarity score that represents similarity between the image of the fingerprint of the particular person and the reference image of the fingerprint of the reference person.

6. The biometric authentication system of claim 1:
   wherein the biometric verification system is configured to access the data for the particular biometric image of at least the portion of the particular person by accessing data for an image of a face of the particular person; and
   wherein the biometric verification system is configured to compute the particular similarity score that represents similarity between the particular biometric image and the reference image by computing a similarity score that represents similarity between the image of the face of the particular person and the reference image of the face of the reference person.

7. The biometric authentication system of claim 1 comprising:
   a biometric enrollment system configured to determine, for each person in the group of multiple, different people, the similarity score that represents a similarity between a biometric image of at least a portion of the corresponding person from the group of multiple, different people and the reference image and sort biometric data that includes all of the determined similarity scores using the determined similarity scores, wherein the reference image is used in determining all of the similarity scores included in the biometric data.

8. The biometric authentication system of claim 7:
   wherein the biometric data maintained by the data storage system comprises the corresponding biometric image or blob data descriptive of the corresponding biometric image; and
   wherein the biometric enrollment system is configured to link, for each person in the group of multiple, different people, the similarity score for the corresponding person with the corresponding biometric image or the blob data.

9. The biometric authentication system of claim 8, wherein the data storage system comprises a memory storage system and a disk storage system, and the data storage system is configured to maintain the sorted similarity scores in the memory storage system and maintain the corresponding biometric image or the blob data in the disk storage system.

10. The biometric authentication system of claim 7, wherein the biometric enrollment system is configured to enroll a new person in the data storage system by:
   accessing data for a new biometric image of at least a portion of the new person;
   computing a new similarity score that represents similarity between the new biometric image and the reference image;
   determining a unique identifier for the new person;
   storing, in the data storage system and in association with the unique identifier, the new similarity score at an appropriate point in the sorted similarity scores; and
   storing, in the data storage system and in association with the unique identifier, the corresponding biometric image or blob data descriptive of the corresponding biometric image.

11. The biometric authentication system of claim 1, wherein the biometric verification system is configured to compute the particular similarity score that represents similarity between the particular biometric image and the reference image by:
   accessing data for multiple biometric images of the portion of the particular person;
   computing, for each of the multiple biometric images, a similarity score that represents similarity between the corresponding biometric image and the reference image; and
   computing an average similarity score based on the similarity scores computed for the multiple biometric images.

12. The biometric authentication system of claim 1:
   wherein the biometric verification system is configured to search the sorted similarity scores included in the biometric data using the computed particular similarity score by:
      using a search process that leverages knowledge of how the similarity scores included in the biometric data are sorted to find a subset of the people that are each associated with a similarity score within a threshold of the computed particular similarity score;
      accessing corresponding biometric image or blob data descriptive of the corresponding biometric image for the subset of the people;
      comparing the accessed corresponding biometric image or the accessed corresponding blob data for the subset of the people to the particular biometric image or blob data descriptive of the particular biometric image for the particular person; and
      based on comparison results, identifying the closest match.

13. The biometric authentication system of claim 1, wherein the biometric verification system is configured to compute the particular similarity score that represents similarity between the particular biometric image and the reference image by using an image similarity process to generate a similarity measure between the particular biometric image and the reference image and normalizing the similarity measure to a similarity score between zero and one.

14. The biometric authentication system of claim 1:
   wherein the biometric verification system is configured to access the data for the particular biometric image of at least the portion of the particular person by accessing data for multiple biometric images of the particular person, each of the multiple biometric images corresponding to a different portion of the particular person;
   wherein the biometric verification system is configured to compute the particular similarity score that represents similarity between the particular biometric image and the reference image by:
      computing multiple similarity scores, each of the multiple similarity scores representing similarity between one of the multiple biometric images and one of multiple reference images; and
      computing a fused similarity score based on the multiple similarity scores; and
   wherein the biometric verification system is configured to search the sorted similarity scores included in the biometric data using the computed particular similarity score by searching the sorted similarity scores included in the biometric data using the fused similarity score.

15. The biometric authentication system of claim 14, wherein the biometric verification system is configured to compute the fused similarity score based on the multiple similarity scores by taking a weighted average of the multiple similarity scores.

16. The biometric authentication system of claim 1:
   wherein the biometric verification system is configured to access the data for the particular biometric image of at least the portion of the particular person by accessing data for multiple biometric images of the particular person, each of the multiple biometric images corresponding to a different portion of the particular person;
   wherein the biometric verification system is configured to compute the particular similarity score that represents similarity between the particular biometric image and the reference image by:
      computing multiple similarity scores, each of the multiple similarity scores representing similarity between one of the multiple biometric images and one of multiple reference images; and
      arranging the multiple similarity scores in a vector of similarity scores; and
   wherein the biometric verification system is configured to search the sorted similarity scores included in the biometric data using the computed particular similarity score by searching the sorted similarity scores included in the biometric data using the vector of similarity scores.

17. The biometric authentication system of claim 1, wherein the biometric verification system is configured to output the closest match based on the determination that the difference satisfies the threshold difference value by outputting the data, from the biometric data, for the particular person to a device for presentation on a display.

18. A method comprising:
   maintaining, in electronic storage and for a group of multiple, different people, biometric data that includes sorted similarity scores, wherein each similarity score represents a similarity between a biometric image of at least a portion of a corresponding person from the group of multiple, different people and a reference image;
   accessing data for a particular biometric image of at least a portion of a particular person;

computing a particular similarity score that represents similarity between the particular biometric image and the reference image used in computing the similarity scores for each person in the group of multiple, different people;

searching, by a biometric authentication system that includes at least one processor and using the computed particular similarity score, the sorted similarity scores included in the biometric data for the group of multiple, different people to find a closest match to the computed particular similarity score in the sorted similarity scores;

computing a difference between the computed particular similarity score and a similarity score of the closest match;

determining whether the difference satisfies a threshold difference value; and outputting the closest match based on a determination that the difference satisfies the threshold difference value.

19. At least one non-transitory computer-readable storage medium encoded with executable instructions that, when executed by at least one processor, cause the at least one processor to perform operations comprising:

maintaining, in electronic storage and for a group of multiple, different people, biometric data that includes sorted similarity scores, wherein each similarity score represents a similarity between a biometric image of at least a portion of a corresponding person from the group of multiple, different people and a reference image;

accessing data for a particular biometric image of at least a portion of a particular person;

computing a particular similarity score that represents similarity between the particular biometric image and the reference image used in computing the similarity scores for each person in the group of multiple, different people;

searching, by a biometric authentication system that includes at least one processor and using the computed particular similarity score, the sorted similarity scores included in the biometric data for the group of multiple, different people to find a closest match to the computed particular similarity score in the sorted similarity scores;

computing a difference between the computed particular similarity score and a similarity score of the closest match;

determining whether the difference satisfies a threshold difference value; and outputting the closest match based on a determination that the difference satisfies the threshold difference value.

* * * * *